United States Patent [19]
Iwata et al.

[11] Patent Number: 5,889,345
[45] Date of Patent: Mar. 30, 1999

[54] WATERPROOF ELECTRIC MOTOR STRUCTURE

[75] Inventors: Masato Iwata, Kiryu; Hiroshi Hagiwara, Isesaki; Eiichi Machida, Maebashi, all of Japan

[73] Assignee: Mitsuba Corporation, Kiryu, Japan

[21] Appl. No.: 889,075

[22] Filed: Jul. 7, 1997

[30] Foreign Application Priority Data

Jul. 8, 1996 [JP] Japan ................... 8-197045

[51] Int. Cl.⁶ .................. H02K 5/10; H02K 5/00
[52] U.S. Cl. .................. 310/88; 310/89; 310/71
[58] Field of Search ................. 310/88, 89, 71, 310/87, 91, 249, 85

[56] References Cited

U.S. PATENT DOCUMENTS 4,518,886  5/1985  Kaneyuki .................. 310/71
5,576,586  11/1996  Blumenberg .................. 310/88

*Primary Examiner*—Nestor Ramirez
*Assistant Examiner*—Dang Dinh Le
*Attorney, Agent, or Firm*—Oliff & Berridge, PLC

[57] ABSTRACT

A waterproof electric motor structure in which a yoke 5 is covered with a bottomed cylindrical waterproof cover 12. An open end edge portion 12a of the waterproof cover 12 is internally engaged with a recessed groove portion 10b of a pump bracket 10 by being abutted thereagainst and sealed by a seal member 13. Through holes 5d, 12c are defined in the yoke 5 and the waterproof cover 12, respectively, and a locking cylinder 12d is formed in the cover side through hole 12c. A coupler 14 assembled to pass through both the through holes 5d, 12c is supported by the locking cylinder 12d in a removal prevention state. Further sealing is made by interposing a seal member 16 between a cover side stepped portion 12f and a coupler side stepped portion 14d.

7 Claims, 10 Drawing Sheets

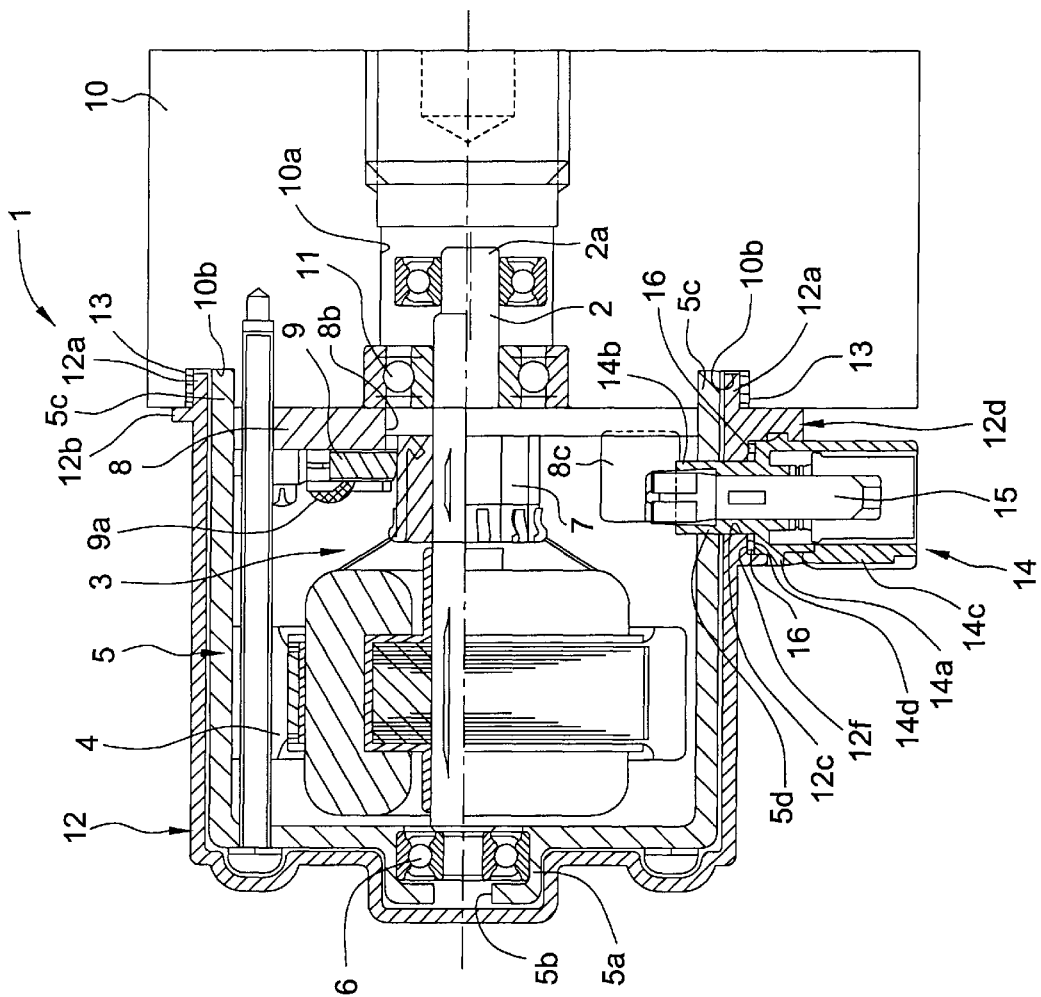

WATERPROOF ELECTRIC MOTOR STRUCTURE

BACKGROUND OF THE INVENTION

1. Field of Invention

The present invention belongs to the technical field of a waterproof electric motor structure constituting electrical equipment mounted on a vehicle.

2. Description of Related Art

In general, some of these types of electric motors must be subjected to a high degree of waterproof processing depending upon the locations where they are disposed. In waterproofing such electric motors, portions where a yoke communicates with the inside and outside of the electric motor must be sealed. This can include a portion where the yoke, in which an armature shaft as the output shaft of the electric motor is rotatably accommodated, is coupled with an end bracket for covering the opening end of the yoke. Further, a portion through which a cable is drawn from the outside to supply electric power to brushes and the like must be sealed.

An example of such an electric motor is shown in FIG. 10. A cover member 21 composed of a bottomed cylindrical rubber for covering the opening of a yoke 20 is outwardly engaged with an outer peripheral surface of the yoke and the cover member 21 is sealed by tightening the edge thereof using a hinge tie 22. In this arrangement, since a lead wire 23 for supplying electric power to brushes must be drawn from the outside, a through hole is defined to the yoke 20 and the lead wire 23 is passed therethrough. For this purpose, a cover member through hole must also be defined for the cover member 21 in confrontation with the above through hole.

In this arrangement, the cover member 21 must be manually mounted to the yoke 20 while causing it to be elastically deformed. Further, this must be carried out while aligning the cover member through hole with the yoke through hole. Thus, there is a problem that workability is made inevitably bad and it is necessary to fix the hinge tie 22 to tighten the edge of the cover member 21 for the seal of it. Since all of these steps are carried out manually, dispersion in products is caused.

Furthermore, there is also a problem that both the through holes must be sealed separately and a step of passing the lead wire through the respective through holes is time-consuming and troublesome. Thus, this problem is also a subject to be solved by the present invention.

SUMMARY OF THE INVENTION

The invention provides a waterproof structure of an electric motor having a yoke in which an armature shaft serving as a motor output shaft is rotatably accommodated and which is assembled by being abutted against a bracket on an output side through the opening thereof. The waterproof structure comprises a bottomed cylindrical waterproof cover for covering the entire yoke. An opening end of the waterproof cover is internally engaged with a recessed groove portion that is formed to the bracket and has a seal member filled therein. Through holes are defined in respective cylinder portions of the yoke and the waterproof cover in an aligned state to assemble a coupler for electrically connecting a commutator to the outside. One of the through holes on the waterproof cover side has a large diameter locking cylinder with a stepped portion that is projectingly formed so as to communicate with the through hole. Means are provided for assembling the coupler in a removal- prevention state so that it reaches the interior of the yoke from a locking cylinder. A seal member is interposed between the stepped portion and the coupler for sealing the through hole.

BRIEF DESCRIPTION OF THE DRAWINGS

FIG. 1 is a side elevational view, partly in cross section, of an electric motor;

DETAILED DESCRIPTION OF PREFERRED EMBODIMENTS

Figure 2A:
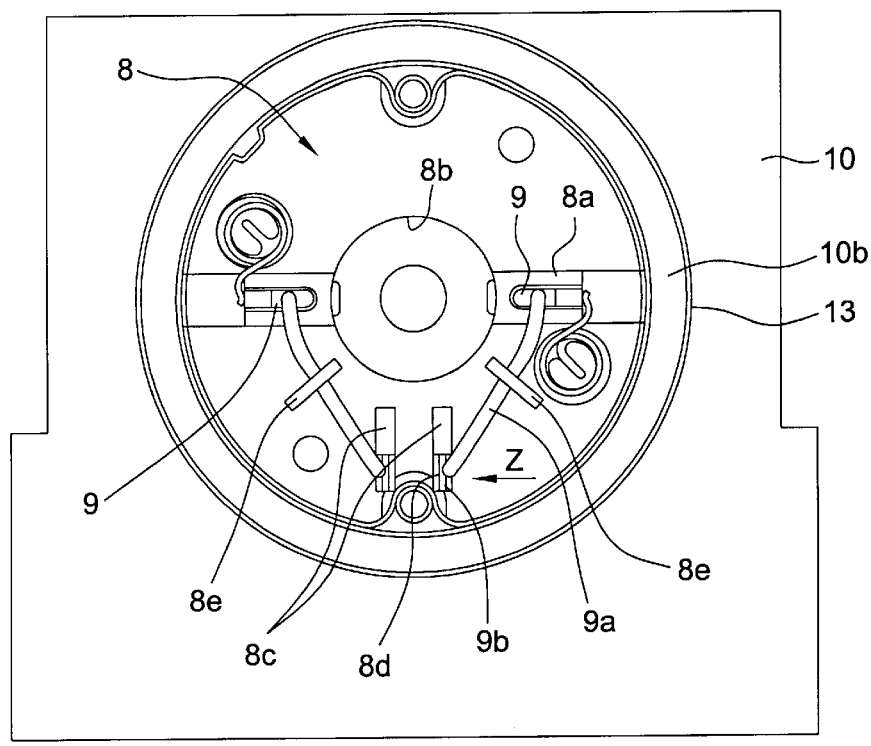
FIG. 2(A) is a front elevational view showing a base unit assembled to a pump bracket.
Figure 2B:
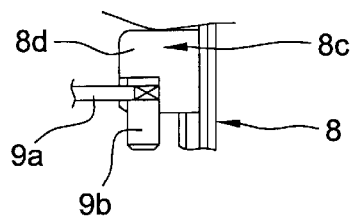
FIG. 2(B) is a view in the direction of the arrow Z in FIG. 2(A)
Figure 2C:
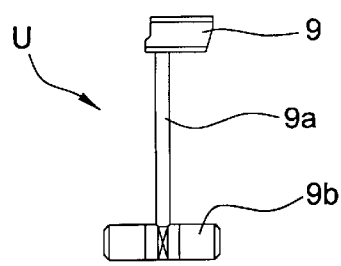
FIG. 2(C) is a front elevational view of a terminal assembly.
Figure 3:
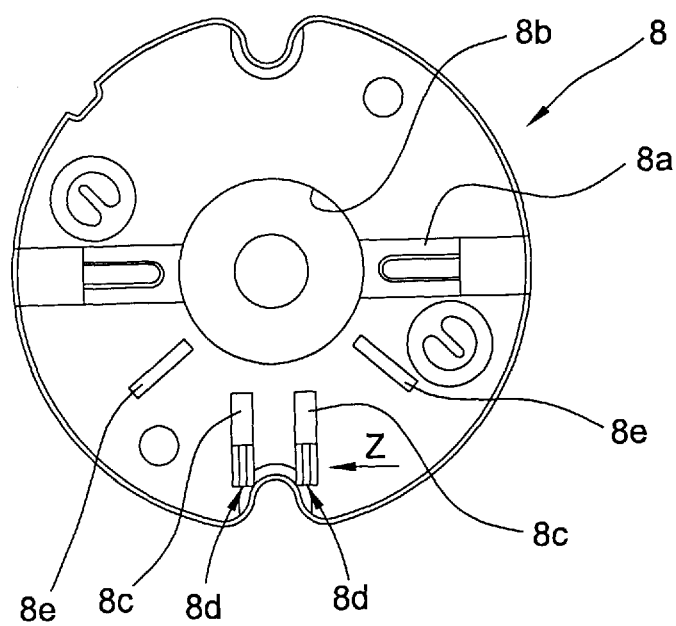
FIG. 3 is a front elevational view of a base unit.
Figure 4:
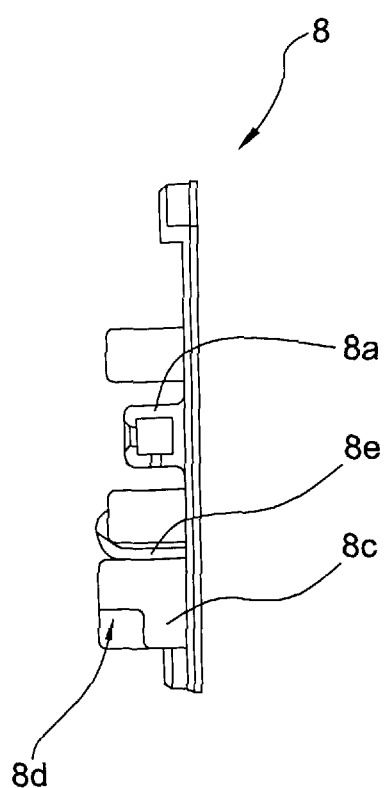
FIG. 4 is a side elevational view of the base unit.
Figure 5A:
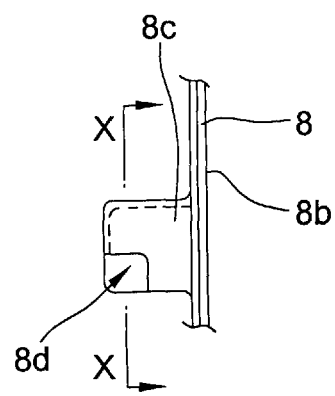
FIG. 5(A) is a view in the direction of the arrow Z in FIG. 3.
Figure 5B:
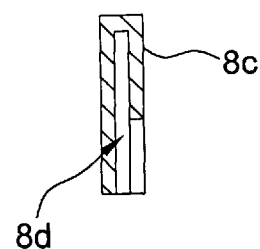
FIG. 5(B) is a cross sectional view taken along the line X—X of FIG. 5(A)
Figure 6:
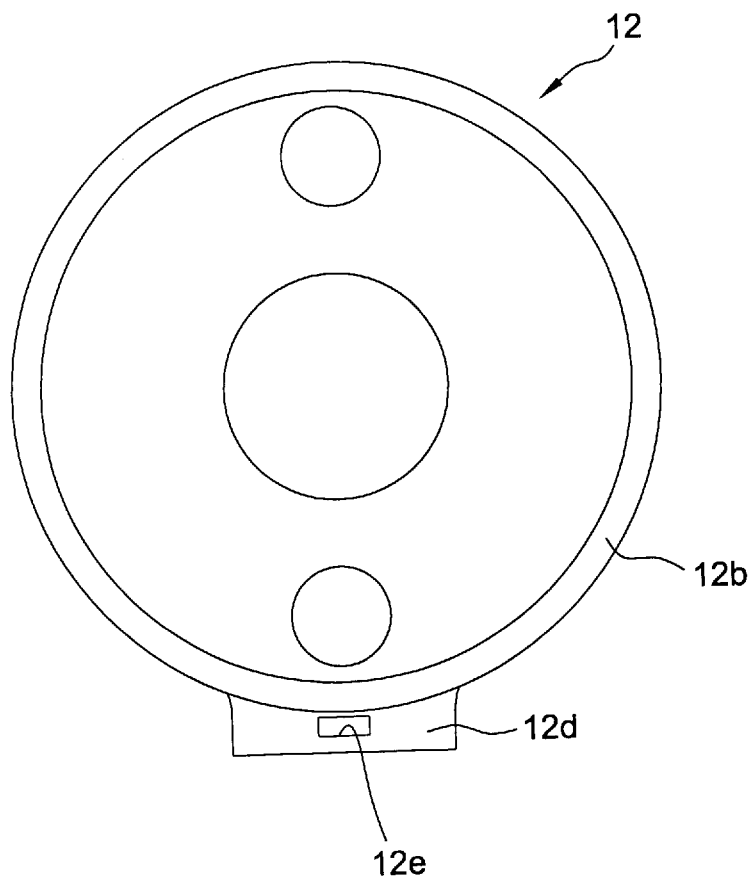
FIG. 6 is a front elevational view of a waterproof cover.
Figure 7:
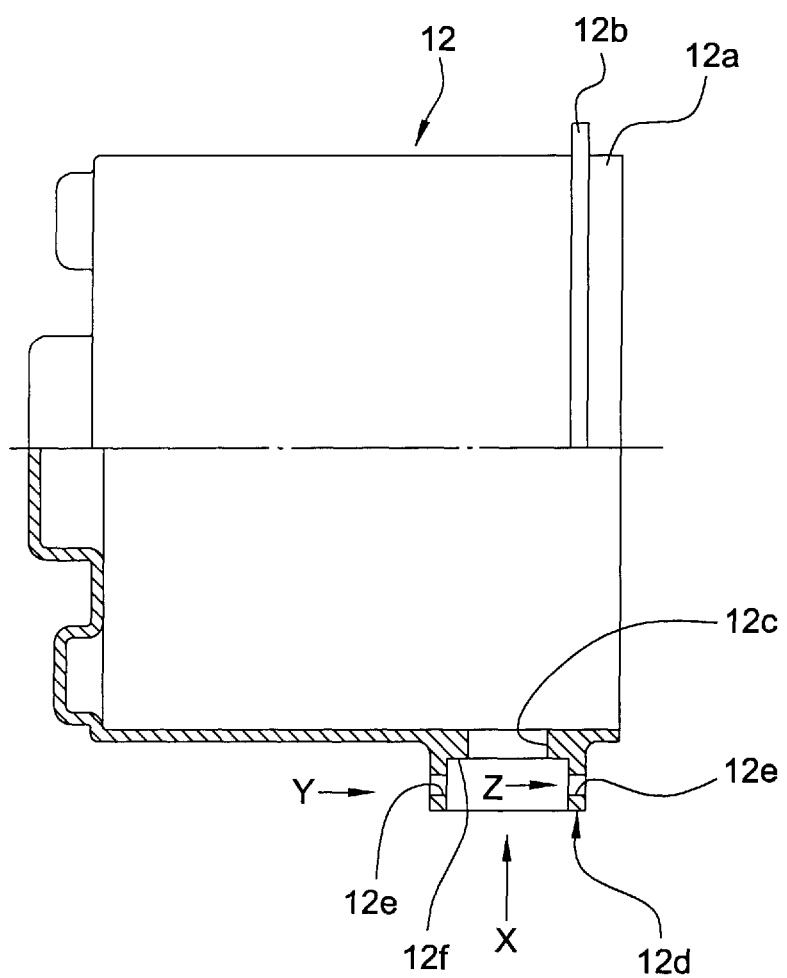
FIG. 7 is a side elevational view of the waterproof cover.
Figure 8:
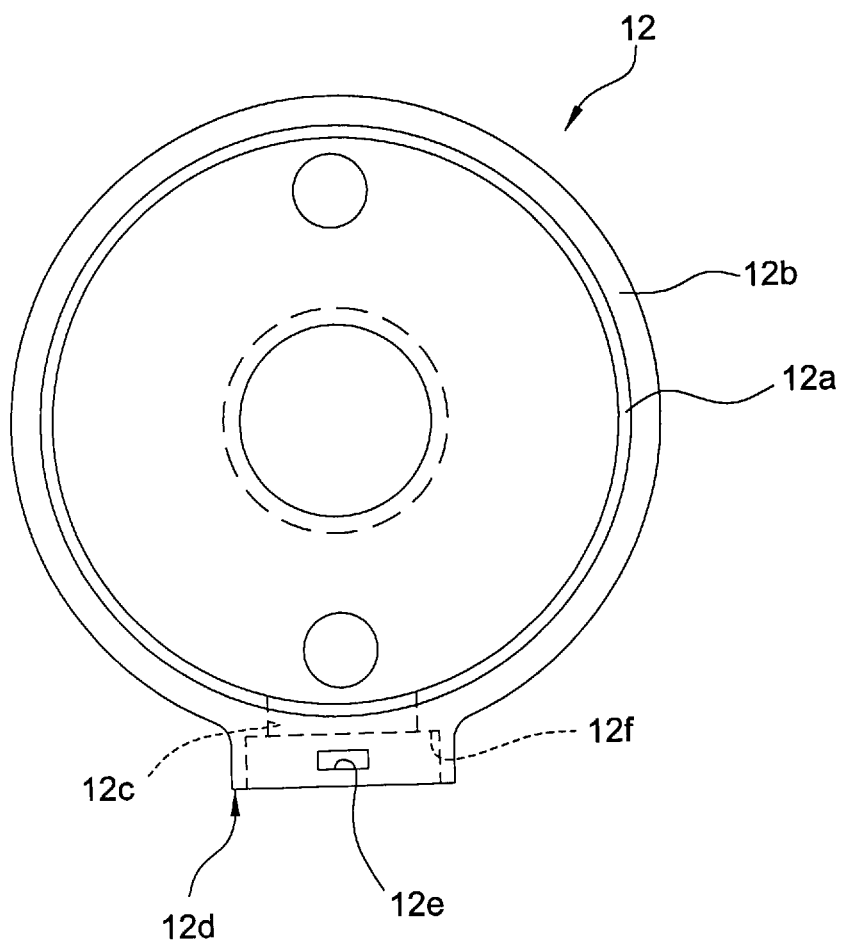
FIG. 8 is a backside view of the waterproof cover.
Figure 9A:
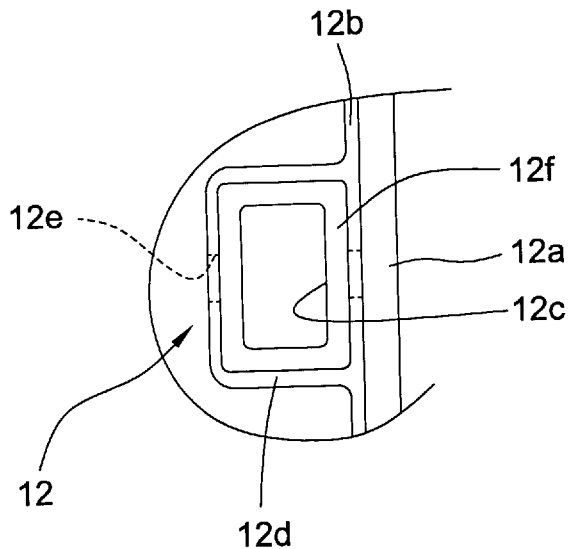
FIG. 9(A) is a view in the direction of the arrow X in FIG. 7.
Figure 9B:
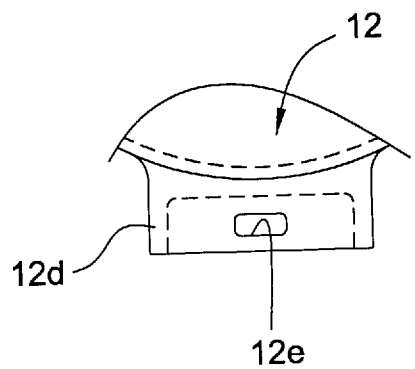
FIG. 9(B) is a view in the direction of the arrow Y in FIG. 7.
Figure 9C:
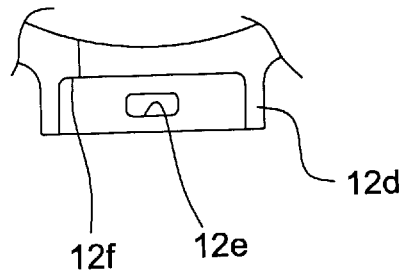
FIG. 9(C) is a view in the direction of the arrow Z in FIG. 7.
Figure 10:
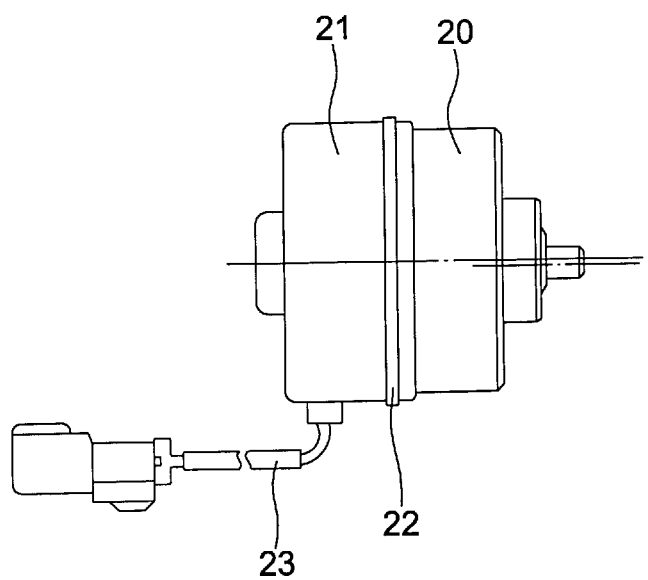
FIG. 10 is a side elevational view showing a conventional example.

An embodiment of the present invention will be described with reference to FIGS. 1 to 9.

In the drawings, numeral 1 denotes an electric motor for an anti-lock brake device. The electric motor 1 is arranged such that an armature core 3 rotated integrally with an armature shaft 2 is accommodated in a yoke 5 having a permanent magnet 4 secured to the inner peripheral surface thereof. An eccentric output shaft portion 2a is formed at the extreme end of the armature shaft 2 and a piston rod for the brake device is coupled with the eccentric output shaft portion 2a. These arrangements are similar to those of prior art.

The yoke 5 is formed in a bottomed cylindrical shape and has a small diameter cylindrical portion 5a projecting from a cylinder bottom surface thereof outward and a base end portion of the armature shaft 2 is rotatably supported by the small diameter cylindrical portion 5a through a bearing 6. A jig insertion hole 5b is defined in the cylinder bottom surface of the small diameter cylindrical portion 5a to insert an unshown jig used to assemble the armature shaft 2. A commutator 7 is assembled to the extreme end side of the armature shaft 2 integrally therewith, whereas a base unit 8 is accommodated to an open end side of the yoke 5 and the extreme ends of brushes 9, which are accommodated in a pair of brush holders 8a so as to freely move therein, are disposed to be in sliding contact with the commutator 7 of the armature shaft 2 in an elastically pressed state. Further, the extreme end of the armature shaft 2 passes through a through hole 8b defined in the base unit 8 and projects to the outside.

Numeral 10 denotes a pump bracket assembled to cover the opening of the yoke 5 in an abutted state. The pump bracket 10 is formed in a square cylindrical shape with an inner cylindrical portion 10a defined at the center thereof. The pump bracket 10 is assembled in such a manner that the extreme end of the armature shaft 2 is rotatably supported in an inner cylindrical portion 10a through a bearing 11 and a base end side surface of the pump bracket 10 is abutted against the extreme end side surface of the base unit 8. Further, a recessed groove portion 10b is defined to the base end side surface of the pump bracket 10 at a position confronting the yoke 5 and an open end edge portion 5c of the yoke 5 is internally engaged with a recessed groove portion 10b. The eccentric output shaft portion 2a at the extreme end of the armature shaft 2 is coupled with a piston rod of the brake device in the inner cylindrical portion 10a of the pump bracket 10.

Numeral 12 denotes a plastic waterproof cover used to cover the yoke 5 to clog the jig insertion hole 5b defined in the cylinder bottom surface of the yoke 5. The waterproof cover 12 is formed in a bottomed cylinder shape and an open end edge portion 12a thereof is internally engaged with the recessed groove portion 10b of the pump bracket 10 together with the open end edge portion 5c of the yoke. A flange portion 12b is formed to the open end edge portion 12a and the flange portion 12b is abutted against the groove end of the recessed groove portion 10b when the open end edge portion 12a is internally engaged with the recessed groove portion 10b. Further, the recessed groove portion 10b is filled with a seal member 13 composed of a resin agent to thereby seal the cover open end edge portion 12a and the portion between the open end side of the yoke 5 and the pump bracket 10.

Although terminal holders 8c are formed to the base unit 8 integrally therewith to accommodate and support internal terminal plates 9b connected to respective pig tails 9a drawn out from the pair of brushes 9, the terminal holders 8c project toward the cylinder bottom surface side of the yoke 5. Further, terminal plate holding portions 8d, which open toward an outside diameter direction, are formed to the projecting ends of the terminal holders 8c. The half portion of the internal terminal plate 9b on an inner diameter side is held by the terminal plate holding portion 8d, with a side surface of the remaining half portion thereof on an outer diameter side being exposed. The respective brushes 9 are arranged as a terminal assembly U together with the pig tails 9a. The internal terminal plates 9b and the pig tails 9a are movable between the brushes 9 and the terminal holder 8c by being guided by guide pieces 8e formed on the base unit 8.

Approximately square through holes 5d, 12c are defined in the respective cylinder portions of the yoke 5 and the waterproof cover 12 in an aligned state in confrontation with the terminal plate holding potion 8d, respectively. A square cylindrical locking cylinder 12d is formed in the through hole 12c and projects therefrom outward. The locking cylinder 12d communicates with the through hole 12c on the cover side of the through holes 5d, 12c and has an outside diameter larger than the through hole 12c. Further, locking holes 12e, which are locked to locking claws 14a projecting from a coupler 14 to be described below, are defined in a pair of confronting side surfaces of the locking cylinder 12d.

Although an external terminal plate 15 for drawing out cables to the outside is assembled in the coupler 14 so as to be connected to the internal terminal plates 9b held by the terminal holders 8c in the yoke 5, the coupler 14 includes a square thin cylinder portion 14b that is internally engaged with the respective through holes 5d, 12c, by passing therethrough, and a thick cylinder portion 14c that has a cross-sectional area larger than that of the thin cylinder portion 14b and internally engaged with and supported by the cover side locking cylinder 12d. The external terminal plate 15 is assembled to the thin cylinder portion 14b in a state in which the extreme end thereof projects from the thin cylinder portion 14b.

Then, the coupler 14, to which the external terminal plate 15 is assembled, is assembled such that the coupler 14 is inserted into both the through holes 5d, 12c from the thin cylinder portion 14b side so that the extreme end of the thin cylinder portion 14b reaches up to the interior of the yoke 5. As a result, the coupler 14 is connected in a state in which the external terminal plate 15 is in contact with the internal terminal plates 9b and not shown power supply lead wires are connected to the outside of the thus assembled coupler 14 to thereby supply electric power to the brushes 9. In this assembled state, the stepped portion 14d formed between the thin cylinder portion 14b and the thick cylinder portion 14c of the coupler 14 is set to be abutted against a stepped portion 12f formed between the cover side through hole 12c and the cover side locking cylinder 12d and the abutted portions are sealed by a seal member 16 interposed therebetween. Further, the locking claws 14a formed to the outside surface of the thick cylinder portion 14c are locked to the locking holes 12e in a state in which the coupler 14 is assembled to thereby prevent the removal of the coupler 14 from the waterproof cover 12.

In the embodiment of the present invention arranged as described above, the electric motor 1 has a waterproof structure by sealing the portion where the jig inserting hole 5b is defined to the cylinder bottom surface of the yoke 5, sealing the portion where the yoke 5 is assembled to the pump bracket 10, and sealing the portion where the coupler 14 is assembled to the waterproof cover 12. In this case, the jig inserting hole 5b is sealed by the cylinder bottom surface of the waterproof cover 12 and the surface where the yoke 5 is assembled to the pump bracket 10 is sealed by the open edge portion 12a of the waterproof cover 12 being internally engaged with the recessed groove portion 10b of the pump bracket 10 filled with the seal member 13. Further, the portion where the coupler 14 is assembled is sealed by the seal member 16 interposed between the coupler side stepped portion 14d and the cover side stepped portion 12f to thereby waterproof the electric motor 1.

As described above, since the waterproofing of the electric motor 1 can be achieved only by covering the outer peripheral surface of the yoke 5 with the cover member 12 and sealing the two portions with the seal members 13, 16, the waterproof structure can be simplified. In this arrangement, since the waterproof cover 12 is composed of resin, mounting it can be easily carried out as well because the two portions are sealed with the seal members 13, 16 composed of the resin. Further, workability can be enhanced by omitting a troublesome step that was conventionally required to tighten and fix a rubber cover member by a hinge tie. Additionally, since the coupler 14 passing through the yoke 5 from the outside to the inside thereof can be easily assembled by a simple process of inserting it in one step of operation so that it is sealed and prevented from removal and the electric connection from the outside to the inside of the electric motor 1 can be achieved by only connecting the external lead wires to the external side end of the coupler 14, a conventional step for inserting lead wires into through holes defined in a yoke and a cover member is not necessary. Thus, assembly can be simplified.

Further, a load applied to the portion where both the terminal plates 9b, 15 are connected to each other can be reduced. This is because the internal terminal plates 9b are held by the terminal holders 8c, the external terminal plate 15 is held by the coupler 14 and further the external terminal plate 15 is supported by the thin cylinder portion 14b of the coupler assembled in a state in which it passes through the yoke 5 and the waterproof cover 12 to thereby permit the terminal holders 8c to be located near to the thin cylinder portion 14b. In addition, there is an advantage that the terminal plate holding portions 8d for holding the internal terminal plates 9b not only hold the half portions of the internal terminal plates 9b on the inside diameter side, but also hold the other side surfaces in a state in which one side surface of the half portions on the outside diameter side is left. Thus, the internal terminal plates 9b can be securely protected.

Further, in this embodiment, when the coupler 14 is assembled from the cylindrical portions of the yoke 5 and the waterproof cover 12, the cover 12 can be used as a coupler mounting and supporting member. This is because the support portion for supporting the coupler 14 to prevent the removal thereof is formed to the waterproof cover 12 as the locking cylinder 12d and an external load acting on the coupler 14 is mainly received by the waterproof cover 12 in place of the base unit 8 side where the brush holder is disposed and a large load acting on the base unit 8 side can be prevented. With this arrangement, strength need not be increased different from a case in which a coupler support portion is formed to the base unit 8, which contributes to the miniaturization of the electric motor.

What is claimed is:

1. A waterproof electric motor structure for an electric motor having a yoke in which an armature shaft serving as a motor output shaft is rotatably accommodated and which is assembled by being abutted against a bracket on an output side through an opening thereof, comprising:

a bottomed cylindrical waterproof cover that covers the entire yoke with an opening end of said waterproof cover being internally engaged with a recessed groove portion formed in the bracket and having a first seal member filled therein between the recessed groove and the cover;

through holes defined in respective cylinder portions of the yoke and said waterproof cover in an aligned state so as to communicate with each other, said through holes receiving therethrough a coupler inserted within the yoke that electrically connects a brush to outside, said waterproof cover through hole having a large diameter locking cylinder with a stepped portion that is projectingly formed so as to communicate with said waterproof cover through hole, said locking cylinder extending radially outward from said waterproof cover through hole;

means for assembling said coupler in a removal-prevention state so that said second coupler reaches an interior of the yoke from said locking cylinder; and a second seal member interposed between said stepped portion and said coupler, said second seal member sealing said through holes.

2. The structure of claim 1, further comprising a terminal plate assembled within said coupler and adapted to electrically connect to brushes of said electric motor.

3. The structure of claim 1, wherein said means for assembling includes at least one locking hole located on said locking cylinder and at least one locking claw, matable with said at least one locking hole, located on said coupler.

4. The structure of claim 1, wherein said coupler includes a thin cylinder portion sized to pass through said through holes and a thick cylinder portion with a cross-sectional area greater than said thin cylinder portion and engaged with the locking cylinder.

5. The structure of claim 4, wherein said thin cylinder portion has a substantially square cross-section.

6. The structure of claim 5, wherein said through holes have a substantially square cross-section.

7. The structure of claim 1, wherein said through holes a substantially square cross-section.

* * * * *